United States Patent [19]

Bengtsson et al.

[11] Patent Number: 5,072,714
[45] Date of Patent: Dec. 17, 1991

[54] ARRANGEMENT FOR GENERATOR WINDINGS, ESPECIALLY IN IGNITION SYSTEMS

[75] Inventors: Jörgen Bengtsson, Svanskog; Anders Ågren, ÅM åL all of Sweden

[73] Assignee: AB Svenska Eketromagneter, ÅmåL, Sweden

[21] Appl. No.: 659,374

[22] PCT Filed: Sep. 19, 1989

[86] PCT No.: PCT/SE89/00501
§ 371 Date: Mar. 1, 1991
§ 102(e) Date: Mar. 1, 1991

[87] PCT Pub. No.: WO90/03514
PCT Pub. Date: Apr. 5, 1990

[30] Foreign Application Priority Data
Sep. 20, 1988 [SE] Sweden .................. 8803329

[51] Int. Cl.⁵ .................. F02P 1/02; F02P 3/06; H02K 7/02
[52] U.S. Cl. .................. 123/601; 123/149 C; 123/149 D; 310/70 A; 310/153
[58] Field of Search ......... 123/149 R, 149 C, 149 D, 123/599, 601; 310/70 R, 70 A, 153, 154

[56] References Cited
U.S. PATENT DOCUMENTS 3,495,579 2/1970 Davalillo .................. 123/149 R
4,259,938 4/1981 Johansson .................. 123/601
4,418,677 12/1983 Hofmann .................. 123/599
4,591,746 5/1986 Kamiyama .................. 310/70 A
4,636,671 1/1987 Terada .................. 310/153 X
4,892,079 1/1990 Umezu et al. .................. 123/599 X

FOREIGN PATENT DOCUMENTS 0035154 2/1988 Japan .................. 310/153
0316659 12/1988 Japan .................. 310/153
0448111 1/1987 Sweden .
0446650 9/1986 U.S.S.R. .

Primary Examiner—Willis R. Wolfe
Attorney, Agent, or Firm—Collard, Roe & Galgano

[57] ABSTRACT

The invention relates to a generator arrangement, in particular, ignition systems for internal combustion engines. The arrangement comprises a multi-legged core of magnetically conducting material with the legs radially projecting towards a cooperating magneto flywheel, which exhibits a section with unsymmetrical magnetic flux. The legs carry uniformly wound windings and are connected in two groups in the case of a one-cylinder internal combustion engine. The one group comprises two windings interconnected such that they only deliver an induced voltage when passed by the unsymmetrical section. The other group delivers an induced sum voltage. The voltage of the first mentioned group controls the ignition process whereas the second group charges a capacitor, component of the ignition system.

1 Claim, 2 Drawing Sheets

ARRANGEMENT FOR GENERATOR WINDINGS, ESPECIALLY IN IGNITION SYSTEMS

TECHNICAL FIELD

In capacitor ignition systems for internal combustion engines there is a need for at least two different levels of voltage, that is, one level for charging the capacitor component of the system and another for controlling the spark triggering electronic circuits. There is also often a need to provide a voltage for other electronic circuits which are not associated with the ignition system itself. It is difficult to combine in a simple and inexpensive manner a generator winding for e.g. charging said ignition capacitor and to provide at the same time a suitable control signal for the electronics controlling the spark discharge. In practice it is desirable for solving the above problem to use e.g. one single iron core carrying the necessary windings for generating a voltage for control as well as a voltage for charging. Hereby it is aimed at of course that the control voltage portion takes up as little winding space as possible in order to allow expansion of the other generator windings to the necessary extent. It is also desirable that it be possible to wind all windings in a simple manner in the same manufacturing operation.

PRIOR ART

The magnetic core legs, which are to carry the windings, are suitably arranged in star shape for coaction with the magneto wheel rotating thereabout. Such designs belong to prior art and in this connection reference can be made to the Swedish Patent No. 7806521-6 and the German Patent No. 32 23 039.

SUMMARY OF THE INVENTION

In an arrangement according to the present invention conveniently the magnet poles intended to cooperate with legs of a magnet core are arranged to move along a path or orbit with the core legs arranged in cooperation therewith. The magnet poles are spaced along the path and magnetized alternatingly with different polarity. The core legs are spaced in correspondence with the spacing of the magnet poles, and each core leg carries at least one winding, the windings being so interconnected that they electrically forms at least two groups. The one group comprises at least two windings on separate core legs connected such that the voltages induced, at a uniform magnetic flux through the legs, will cancel one another. The magnetic path is such that it exhibits at least one section of magnetic unsymmetry. The arrangement is suitably such that said one group, when passed by said section of the magnet pole path, will generate an induced voltage. The other group of windings are suitably so interconnected that they coact to generate a sum voltage including induction from symmetrical as well as unsymmetrical parts of the magnet pole path. The voltages just mentioned can be used advantageously in an associated ignition system for an internal combustion engine, the voltage of said first group controlling the ignition process and the voltage of said second group charging a capacitor included in the ignition system. By the present invention the advantage is attained that, from a manufacturing point of view, the generator as well as the control voltage section can be wound in essentially the same winding operation, and at the same time a properly adjusted charging voltage as well as control voltage can be generated.

The features characterizing the present invention will appear from the accompanying claims.

DESCRIPTION OF THE FIGURES

The invention will be described in greater detail with reference to the accompanying drawings which show diagrammatically the structure of an arrangement according to the invention.

DESCRIPTION OF AN EMBODIMENT

Figure 1:
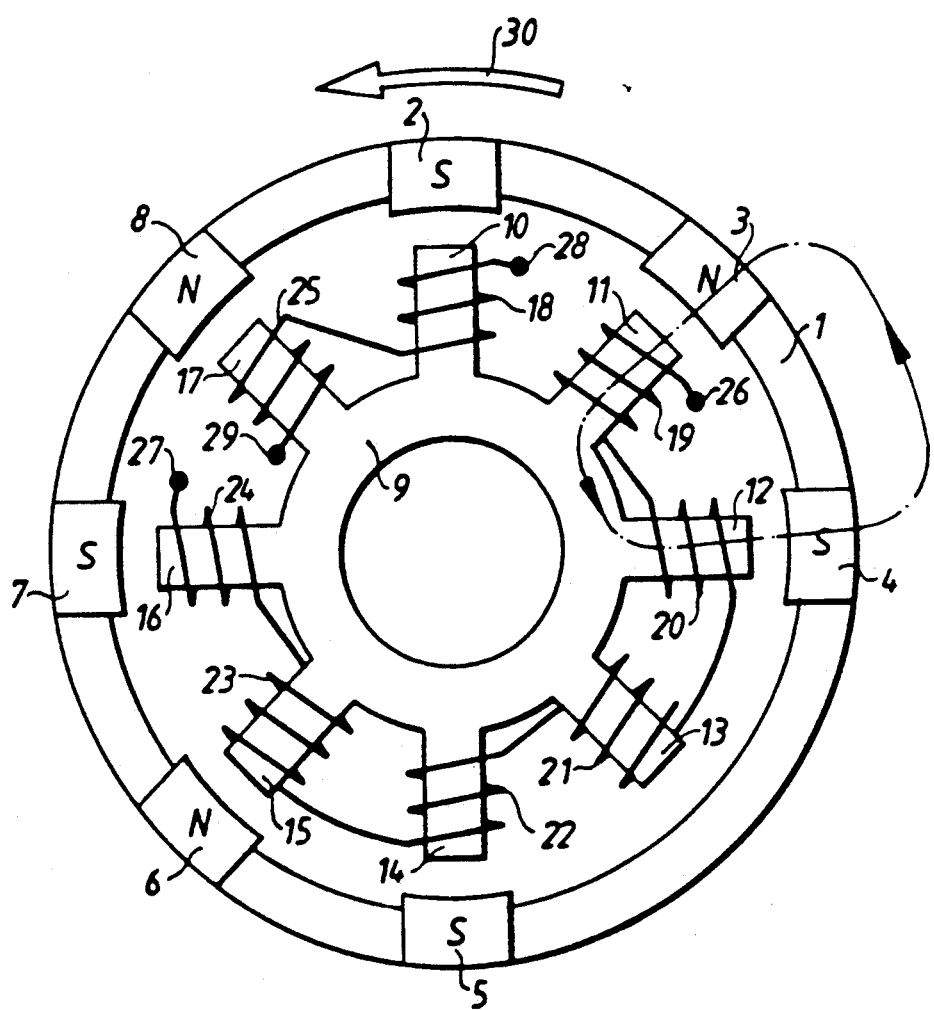
FIG. 1 shows diagrammatically a lateral view of the generator arrangement in one position of rotation.

The arrangement comprises a magneto flywheel 1 carrying seven magnets 2-8 distributed along three quadrants of the periphery of the flywheel. The fourth quadrant, i.e. the space between magnet pole 2 and magnet pole 8, contains no magnet pole, but the spacing of the remaining poles is such as if a magnet pole existed in said quadrant. Centrally of the flywheel there is provided a generator core 9 having eight core legs 10-17 extending radially towards said flywheel 1. The spacing or pitch of legs 10-17 is such that it agrees with the pitch of magnet poles 2-8. There is shown no shaft for carrying wheel 1, nor any associated internal combustion engine. Windings 18-25 are provided on core legs 10-17. All coils are assumed in this case to be wound with wire of one and the same dimension and in one and the same direction. Windings 19-24 are connected in series in such a way that they cooperate in the sense of voltage generating. Tapping points for the voltages generated in the windings are designated 26 and 27. On the other hand windings 18 and 25 are connected such that, when voltages are induced in the windings when traversed by symmetrically alternating magnet fields, these voltages will cancel one another, that is, the windings are connected in opposition to each other. However, when the unsymmetric section of the magneto wheel passes the core leg concerned a voltage will be induced which can be tapped at connection points 28 and 29. It is assumed that the magneto flywheel rotates in the direction of arrow 30.

OPERATION OF THE ARRANGEMENT

In FIG. 1 the magneto flywheel is shown having such a rotational position that core legs 10, 11, 12, 14, 15, 16 and 17 are traversed by symmetrically changing fields, whereas core leg 13 does not coact with any magnet pole. In this momentary position voltages are generated in windings 19, 20, 22, 23, 24 and 25 which, thanks to the series connection, will result in a sum voltage which can be tapped at tapping points 26 and 27. As mentioned above core leg 13 is not exposed to any essential induction at this moment, as this leg is only influenced by stray fields. Hence, in winding 21 lower voltages may arise which can add to or subtract from the other voltages generated in associated windings. During the moment just mentioned of the rotation of the magneto flywheel core legs 10 and 17 are traversed by symmetrically changing fields, which means that the voltages generated in the associated windings 18 and 25 cancel one another. No resulting voltage will thus arise at tapping points 28 and 29.

Figure 2:
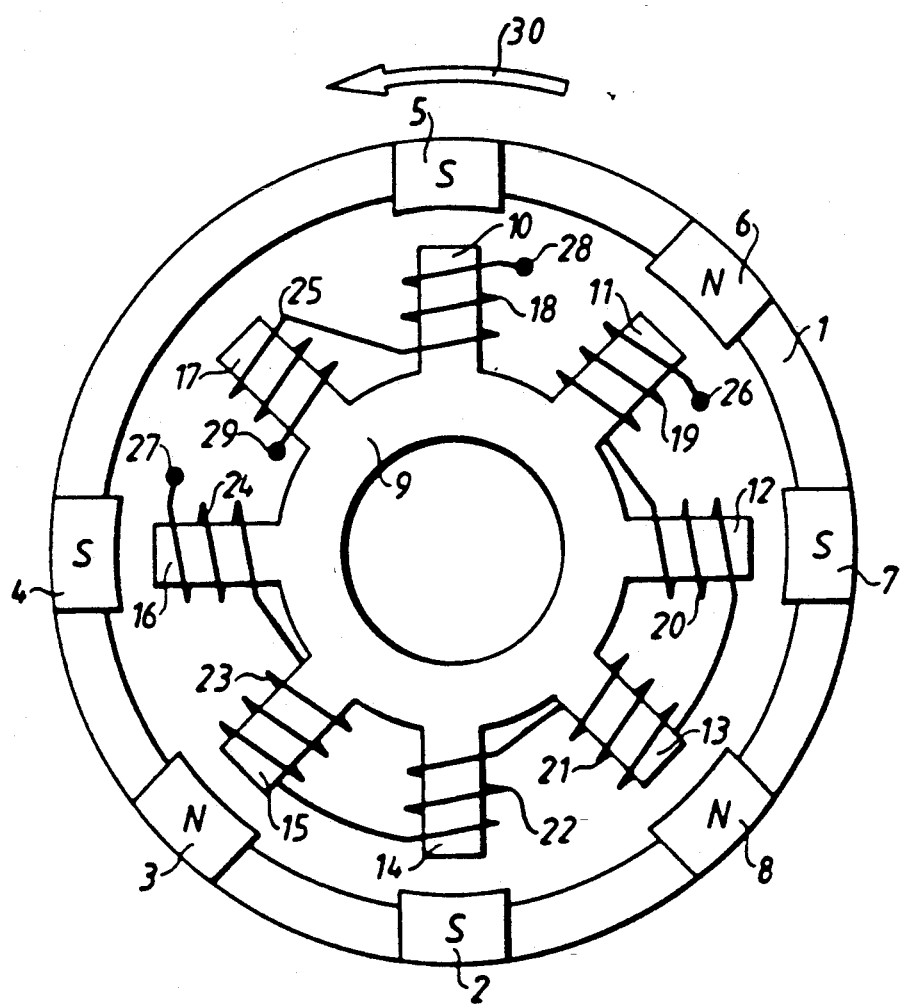
FIG. 2 shows the arrangement illustrated in FIG. 1 in a second position of rotation.

When the magneto flywheel has rotated to the position shown in FIG. 2, core legs 10, 11, 12, 13, 14, 15 and 16 are traversed by symmetrical changes of magnetic flux. The core leg 17, however, does not coact with any magnet pole. As stated previously, in this position a magnetic unsymmetry of field arises between core legs 10 and 17 as also between 16 and 17, to the effect that the voltage induced in winding 18 will be dominant and the stray voltages possibly induced in winding 25 will be subordinated to the voltage in winding 18, a resultant voltage arising between tapping points 28 and 29. This last mentioned voltage is considerably lower than the voltage arising across tapping points 26 and 27. Now, this fact can be utilized to advantage such that the voltage across tapping points 26 and 27 is used for charging a charge capacitor (about 400 volts) occurring in the ignition system, whereas the voltage which can be tapped across points 28 and 29 is used for controlling the ignition process. The voltage arising across said last mentioned tapping points is only a fraction of said first mentioned voltage (in practice about 5 volts).

By an arrangement as described above a very advantageous generator section can thus be obtained for driving an ignition system, e.g., for power saws. From a manufacturing point of view the design is very favourable as all coils can be structured consistently, to the effect that the windings intended for ignition control need not be dimensioned separately, as normally is the case, but the complete device can be set up in e.g. an automatic winding machine, which will wind coil after coil on the respective core leg in an equivalent manner. By this construction, and by the section of the magnetic pole path which is unsymmetrical in view of the magnetic flux and the counter coupling of the two windings 18 and 25, it is attained that appropriate voltages are obtained for charging the ignition capacitor concerned and for controlling the ignition process. Moreover, it is pointed out that for triggering the ignition process a marked and distinct voltage impulse is obtained in e.g. the position of rotation shown in FIG. 2.

As pointed out initially the magneto flywheel can be designed such that instead of leaving out a magnet pole a copolarized magnet pole can be provided between magnet poles 4 and 5 in the example, that is, a magnet pole also exhibiting a south pole. As a matter of course an arrangement according to the invention can also be provided with means for controlling several ignition processes, i.e. several pairs of coacting windings such as 18 and 25 can be provided. This means that the number of core legs could suitably be increased beyond what has been shown above, as well as the number of magnet poles, in doing which, e.g. if a two-cylinder internal combustion engine is to be associated, the two sections free-from-magnet-poles now necessary are provided on diametrically opposed portions of the magneto flywheel.

We claim:

1. An arrangement in generators, in particular for ignition systems, characterized by a flywheel with magnet poles distributed thereon, said flywheel surrounding a magnet core stationary in relation to the path of poles and cooperating with the same, said core having several legs which are distributed in correspondence to the distribution of magnet poles and carry windings which are uniformly wound, preferably in one and the same working operation, and electrically form at least two groups, one or more of the groups comprising at least two windings so connected that the voltages induced at a uniform magnetic flux through their legs will cancel one another, the arrangement being further characterized in that at least one section of the magnet pole exhibits a magnetic unsymmetry, said one of the groups generating when passed by said section of the magnet pole path an induced voltage lower than the voltage induced by the second group, which voltages are arranged to control the ignition process of an associated internal combustion engine and, respectively, to charge a capacitor occurring in the ignition system, the second group having its windings interconnected such that they coact to create a sum voltage including induction from symmetrical as well as unsymmetrical parts of the magnet pole path.

* * * * *